April 28, 1931.  J. TERRY  1,802,849
AEROPLANE CONTROL
Filed Jan. 11, 1930   8 Sheets-Sheet 1
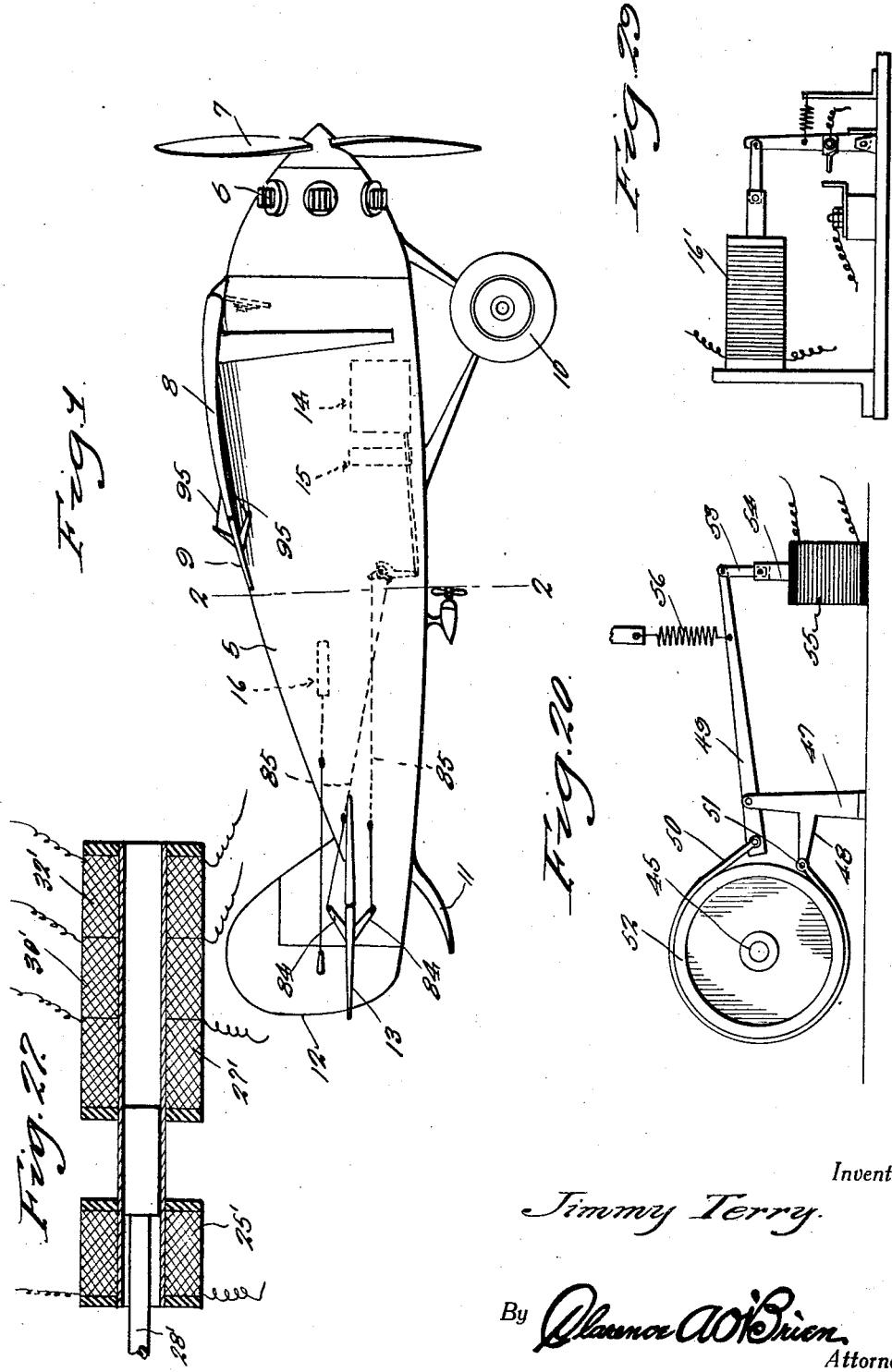
Inventor
Jimmy Terry.
By Clarence A. O'Brien
Attorney April 28, 1931. J. TERRY 1,802,849
AEROPLANE CONTROL
Filed Jan. 11, 1930 8 Sheets-Sheet 2
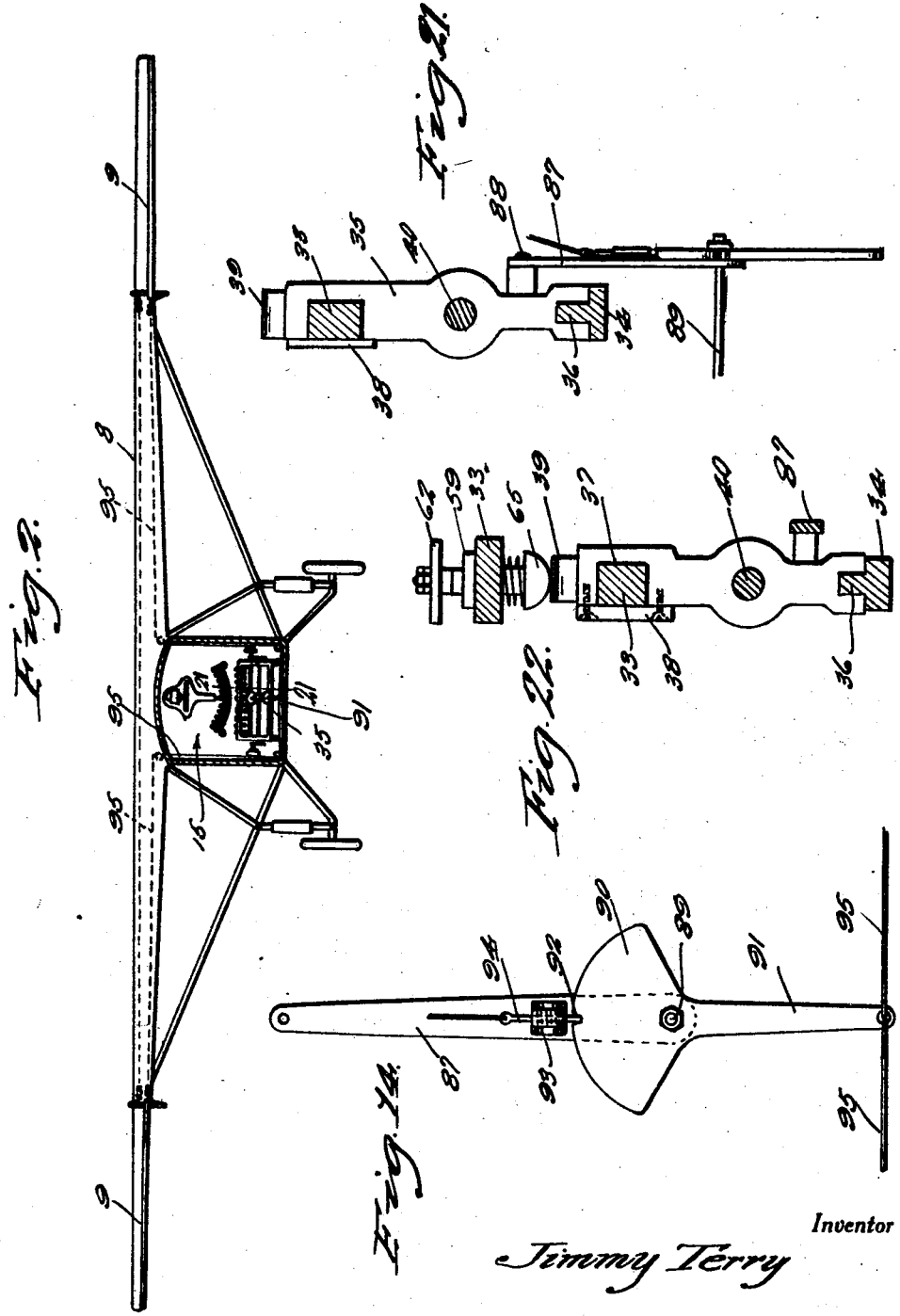
Inventor
Jimmy Terry
By Clarence A. O'Brien
Attorney April 28, 1931. J. TERRY 1,802,849
AEROPLANE CONTROL
Filed Jan. 11, 1930 8 Sheets-Sheet 3
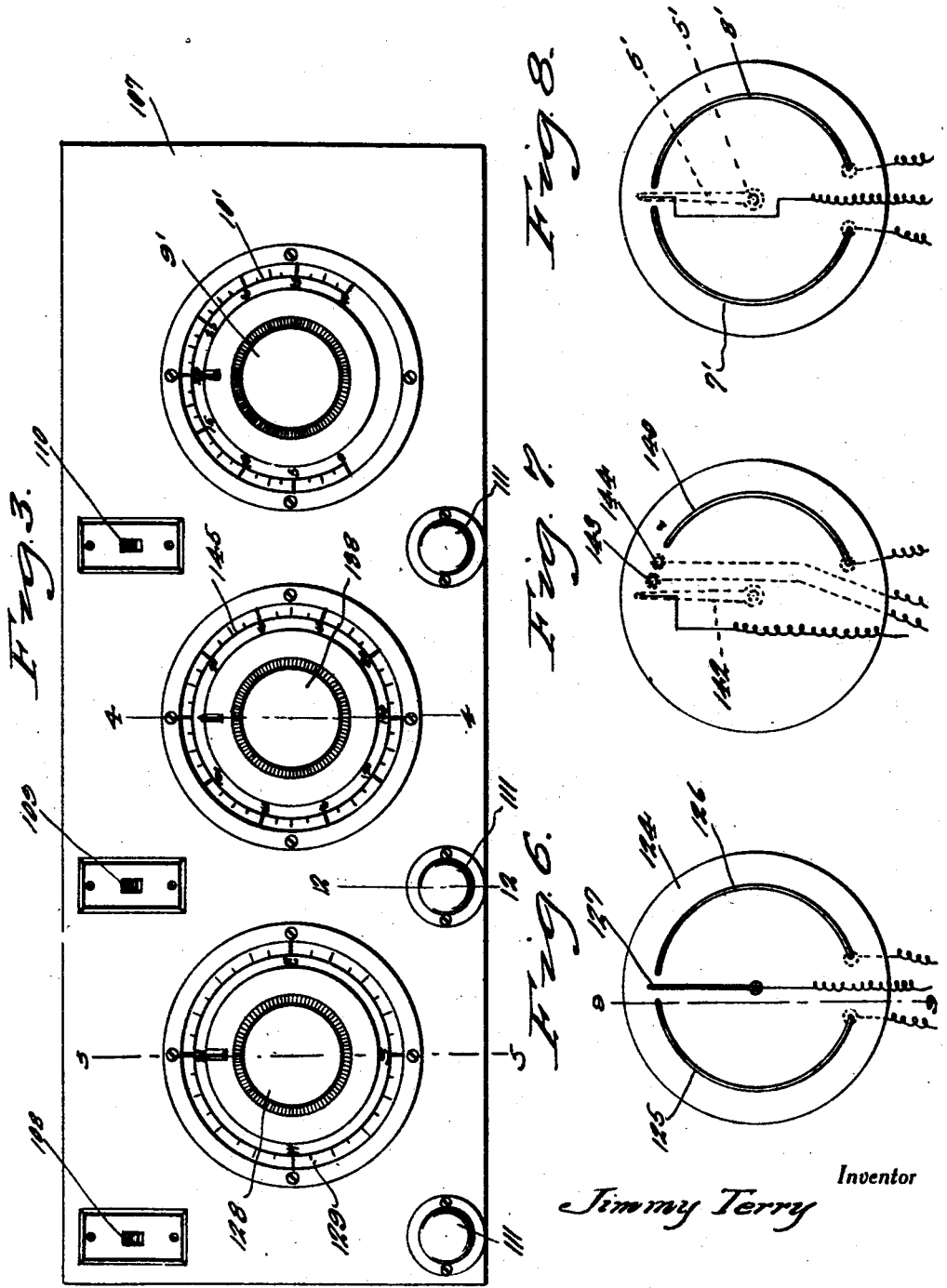
Inventor
Jimmy Terry
By Clarence A. O'Brien
Attorney

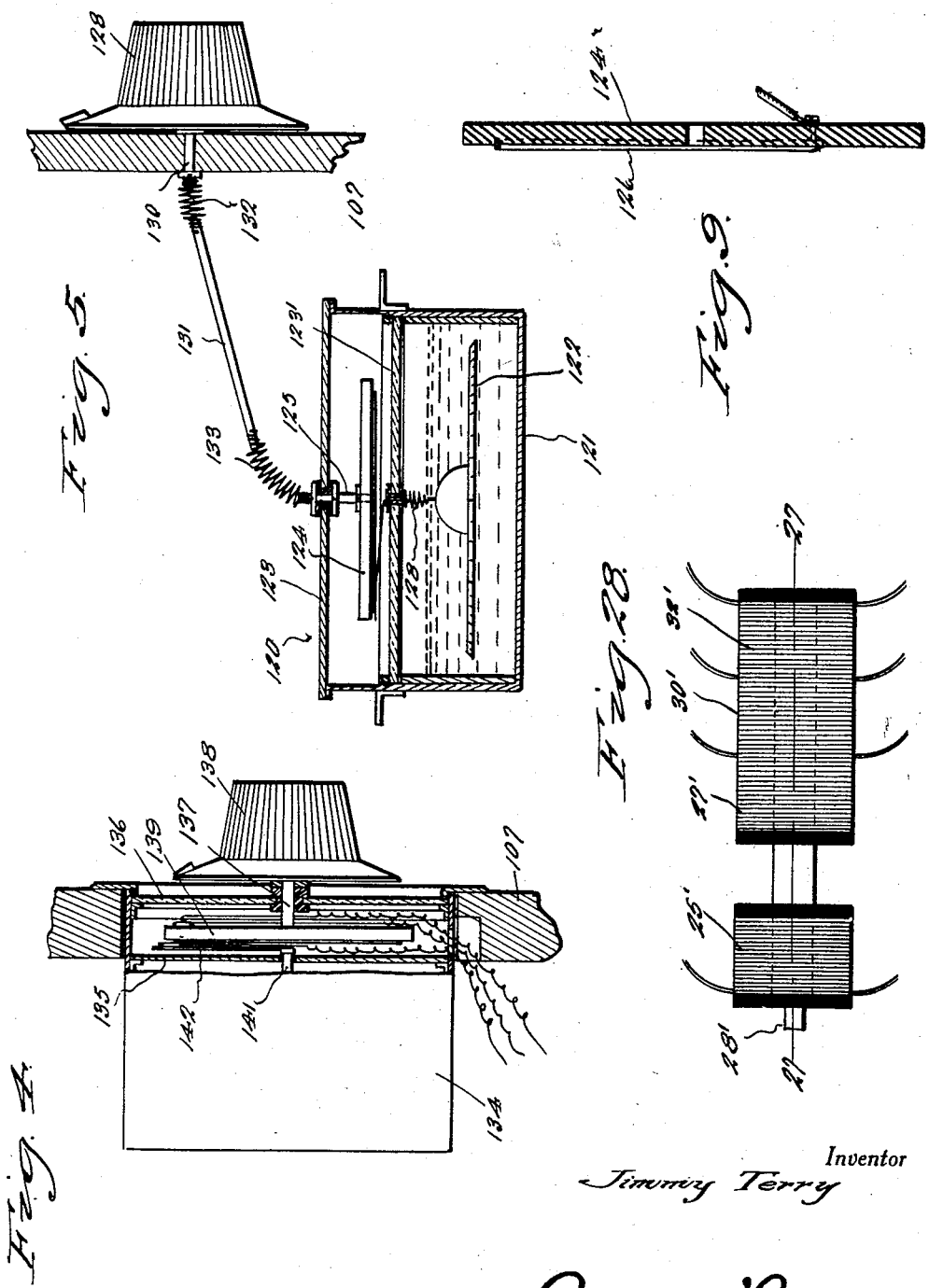

April 28, 1931.  J. TERRY  1,802,849
AEROPLANE CONTROL
Filed Jan. 11, 1930  8 Sheets-Sheet 5
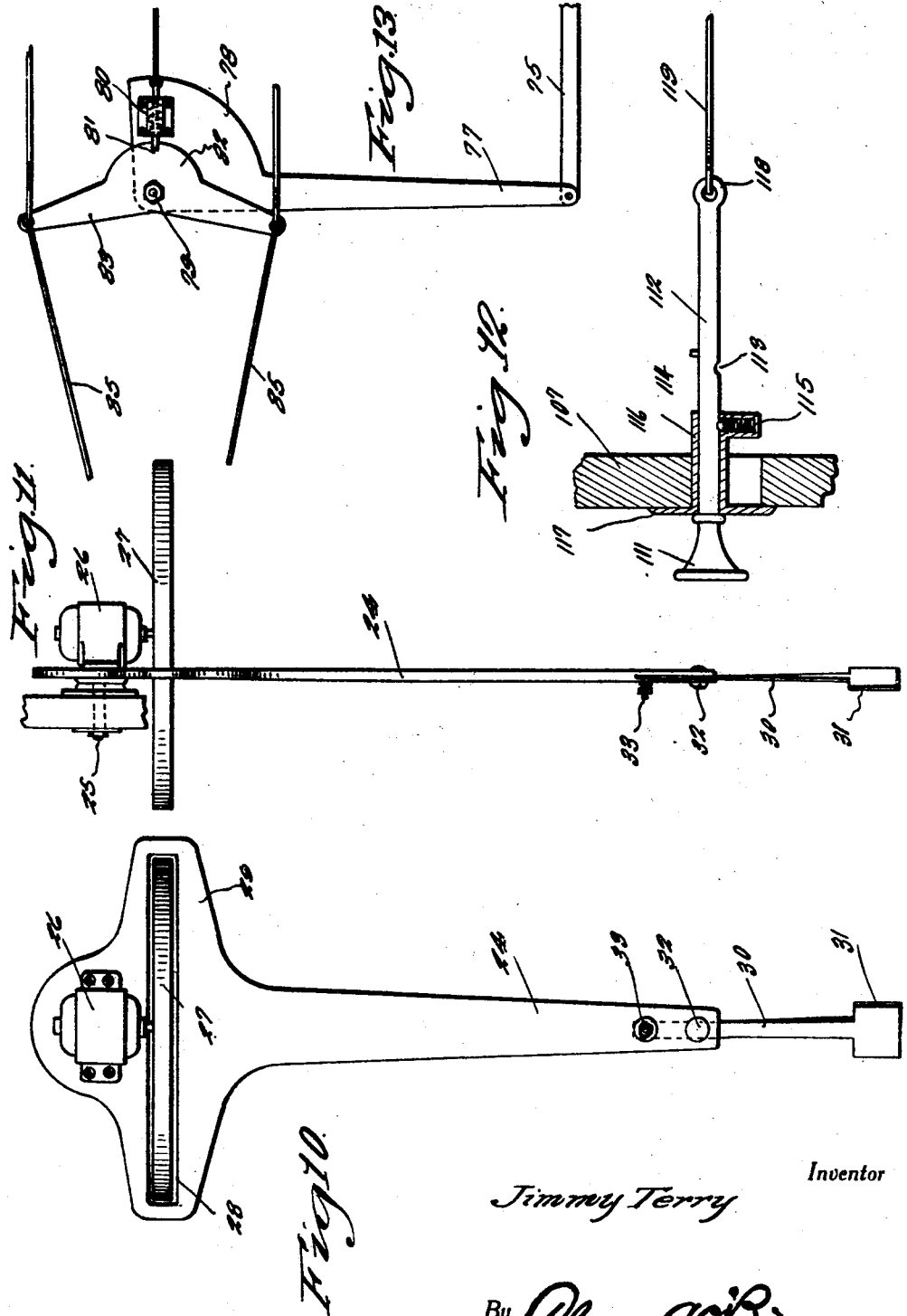
Inventor
*Jimmy Terry*
By *Clarence A. O'Brien*
Attorney

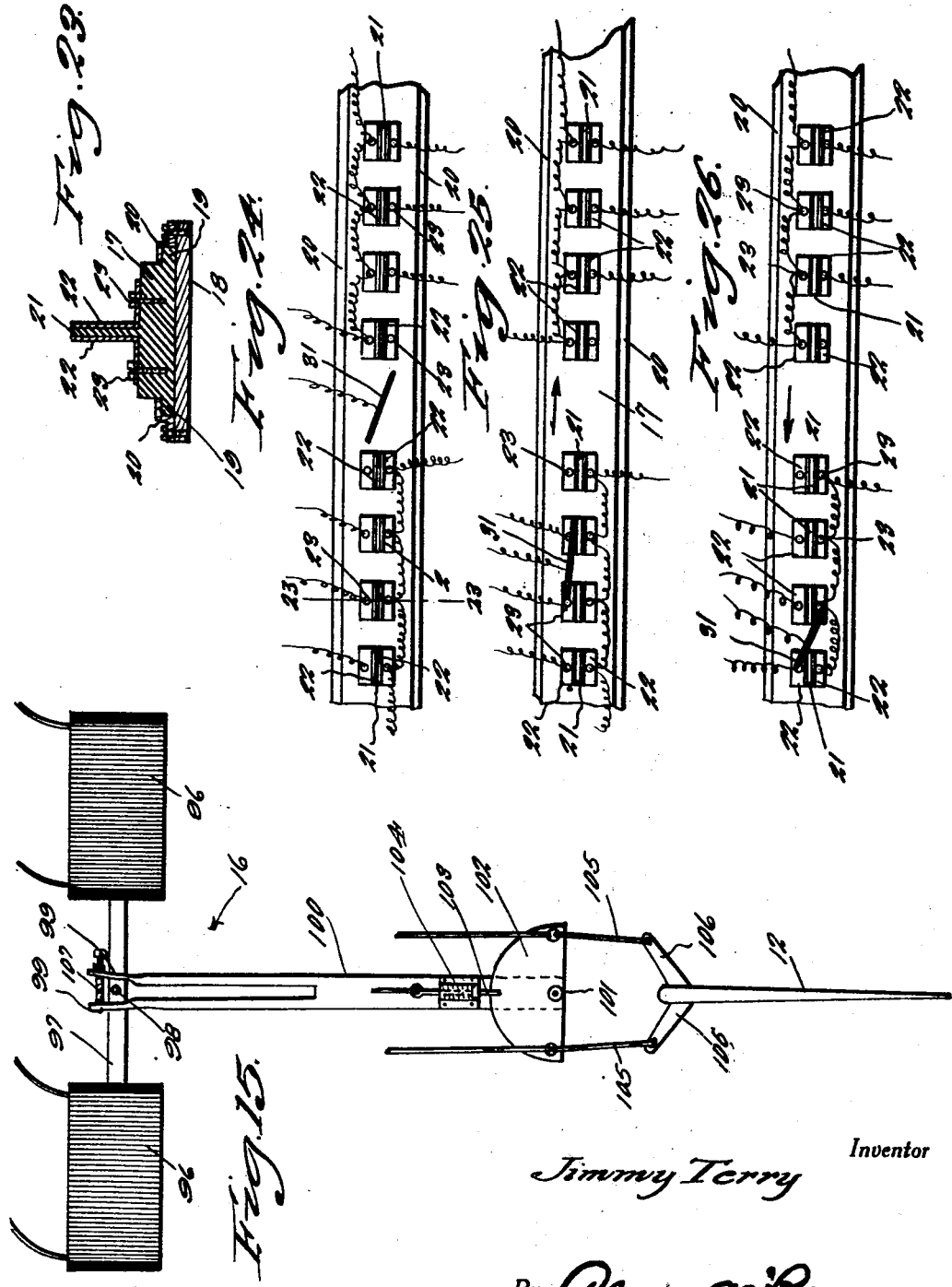

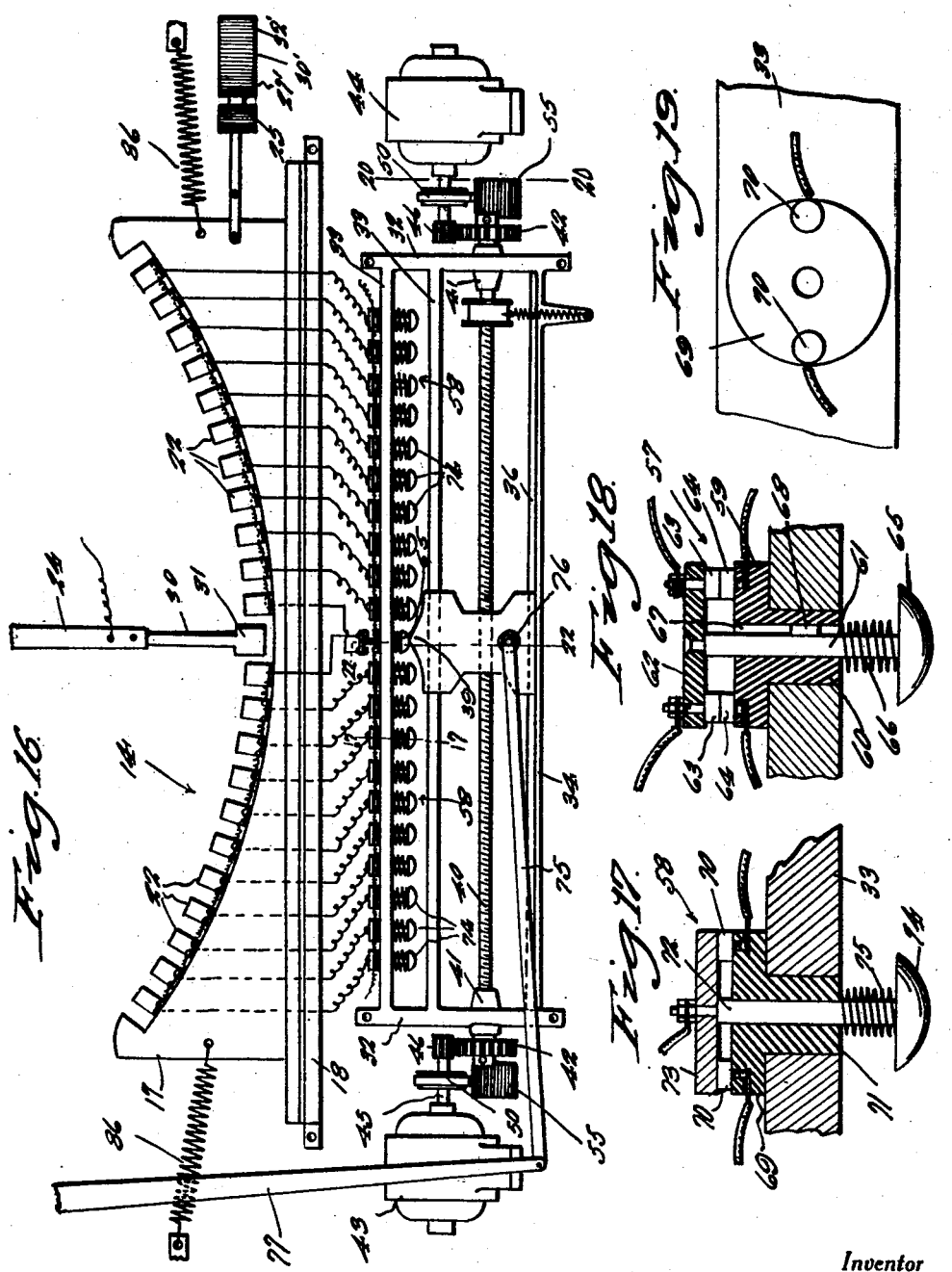

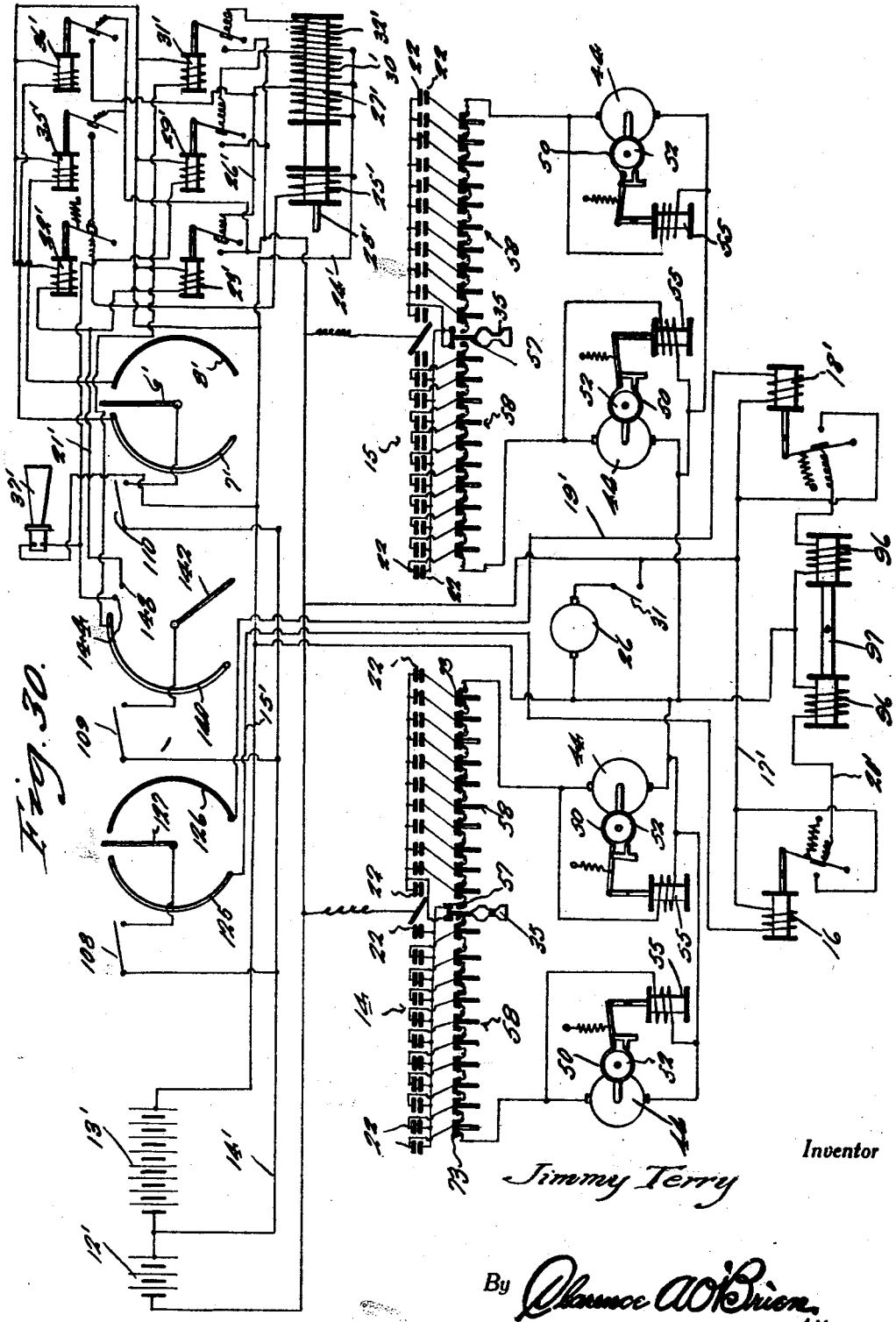

Patented Apr. 28, 1931

1,802,849

UNITED STATES PATENT OFFICE

JIMMY TERRY, OF CHICAGO, ILLINOIS; ANNA ONDRASINA, ADMINISTRATRIX OF SAID JIMMY TERRY, DECEASED, ASSIGNOR OF ONE-HALF TO AMBROSE B. DANTELLA, OF CADOGAN, PENNSYLVANIA

AEROPLANE CONTROL

Application filed January 11, 1930. Serial No. 420,162.

This invention appertains to new and useful improvements in control means for aircraft and more particularly, to means by which the aircraft is controlled in point by inherent agencies.

The principal object of this invention is to provide automatic mechanism for aircraft, which in operation will function to maintain an aeroplane on a given course, and at a predetermined speed.

Another important object of the invention is to provide automatic control means for aircraft wherein the rudder, elevators, and ailerons are actuated to compensate for divergence from the predetermined force, and wherein the automatic means for controlling each of these factors, may be rendered inoperative so that the same may be actuated manually.

These and various other important objects and advantages of the invention will become more apparent to the reader after considering the invention as described and claimed hereinafter.

In the drawings:—

Figure 1 represents a side elevational view of an aeroplane equipped with the novel control means.

Fig. 2 represents a front sectional view of the aeroplane taken substantially on the line 2—2 of Fig. 1.

Fig. 3 is a front elevational view of the control panel.

Fig. 4 is a fragmentary sectional view taken substantially on the line 4—4 of Fig. 3.

Fig. 5 represents a vertical sectional view taken substantially on line 5—5 of Fig. 3.

Fig. 6 is an elevational view of the contact side of the compass adjuster.

Fig. 7 is an elevational view of the contact side of the speed instrument setting.

Fig. 8 is an elevational view of the contact side of the altitude regulator.

Fig. 9 is a sectional view taken substantially on the line 9—9 of Fig. 6.

Fig. 10 is a front elevational view of the gyroscopic contactor.

Fig. 11 is an edge elevational view of the gyroscopic contactor.

Fig. 12 represents a fragmentary sectional view taken substantially on the line 12—12 of Fig. 3.

Fig. 13 is a fragmentary side elevational view of the means for operating the elevators.

Fig. 14 is a front elevational view of means for operating the inner lock.

Fig. 15 represents a top plan view of means for operating the rudder.

Fig. 16 represents a front elevational view of the making and breaking means for controlling the elevators.

Fig. 17 represents a sectional view taken substantially on line 17—17.

Fig. 18 represents a fragmentary sectional view through the central contact unit.

Fig. 19 represents a plan view of the stationary contact of the contact unit shown in Fig. 17.

Fig. 20 represents a side elevational view of one of the magnetic brakes.

Fig. 21 is a vertical sectional view taken substantially on line 21—21 of Fig. 2.

Fig. 22 is a sectional view taken substantially on the line 22—22 of Fig. 16.

Fig. 23 is a cross sectional view of the commutator this section being taken substantially on the line 22—22 of Fig. 24.

Fig. 24 is a fragmentary top plan view of the commutator.

Fig. 25 represents a fragmentary top plan view of the commutator with the contactor engaging one of the contact elements.

Fig. 26 represents a fragmentary top plan view of the commutator showing the contactor about to pass between a pair of the contacts.

Fig. 27 is a longitudinal sectional view through the magnetic unit for controlling the commutator.

Fig. 28 is a side elevational view of the magnetic unit for controlling the commutator.

Fig. 29 is a side elevational view of one of the relay units.

Fig. 30 is a diagrammatic view disclosing the system for controlling the aircraft and showing the electrical connections between the electrical devices involved.

Referring to the drawings wherein like numerals designate like parts, it will be observed in Fig. 1, that the aeroplane may be of conventional design, the same being provided with a fuselage 5 of customary construction, and with an engine 6 in the nose thereof for driving the propeller 7.

The aeroplane may be of the monoplane type, having the wings 8 and the ailerons 9 connected thereto. This automatic aeroplane may be equipped with the usual landing gear 10 and the usual tail skid 11, while the rudder 12 and elevators 13 are of generally conventional construction, and are operated by automatic means, of this invention.

In Fig. 1, it will be noted that the numeral 14 generally refers to the commutator, and means for actuating the rudder to be actuated by the elevators 13, while the unit generally referred to by numeral 15, is the commutator and actuating means for the ailerons 9. The unit generally referred to by numeral 16 is the solenoid for controlling the rudder 12.

The control units 14 and 15 are of substantially the same construction, but are disposed in right angular relation with respect to each other. The unit 14 is disposed longitudinally of the fuselage, while the unit 15 is disposed transversely thereof.

The unit 14 is clearly shown in Fig. 16, and consists of the commutator and the feed mechanism for operating the connection to the elevators. The commutator comprises an elongated block 17 of some suitable di-electric material. This block 17 has its top side curved on the true arc of a circle, while its bottom side is plane and slidable on the base 18.

The block 17 is provided adjacent its bottom side with laterally projecting flanges 19 for disposition within the confines of the guide 20—20, so as to slidably connect the body 17 to the base 18. The body 17 has a plurality of upstanding projections 21 of di-electric material which may be formed integral with the body 17. These projections are spaced longitudinally on the curved stop side of the block 17. These projections are flat and on the same vertical plane, and against each side of each di-electric projection is an L-shaped contact 22, the foot portion of which is secured to the body 17 by screws 23, or some other suitable means.

The gyroscopic contact arm associated with each of the units 14 and 15 consists of the pendant 24 secured at its upper end to a portion of the aircraft structure by suitable means 25. The electric motor 26 is secured to the pendant at this point, and drives a fly wheel or rotor 27 having a portion thereof protruding through the elongated opening 28 of the enlarged upper end portion 29 of the pendant 24.

The lower end portion of this pendant is bifurcated to receive the upper end portion of the leaf spring contactor 30, the same being provided at its lower end with an obliquely disposed head 31. The leaf spring 30 is riveted as at 32 to the pendant 24, and is further secured to the pendant by the binding post 33. The angularity of the head 31 should be observed in Fig. 11.

The gyroscopic contactor is so disposed, as to be always stationary and in wiping relation with either the contact 22 at one side of the commutator or the contact 22 at the opposite side thereof, the spaces between adjacent di-electric projections 21 being sufficient to permit the passage of the head 31 therethrough when the commutator is operated reversely.

It will now be noted, that the commutator is divided longitudinally into two sections, and the innermost di-electric projection of these sections are spaced a substantial distance apart, so as to accommodate the head 31 of the gyroscopic contact when in neutral position.

The feed mechanism associated with each of the commutators of the respective units 14 and 15, comprises a frame including vertical end members 32—32 connected by a pair of closely spaced bars 33—33 at one end, and a guide bar 34 at their opposite or remaining ends. A block 35 is slidably mounted between the bars 34 and the immediate overlying bars 33. This block is provided at its lower end with a groove for receiving the rib 36 on the guide bar 34, while the upper portion 34 is provided with a channel 37 for receiving the lower bar 33. This channel is closed for encompassing the bars 33 by a plate 38.

A pointed nose 39 projects upwardly from the upper end of the block 35. This block is provided with a horizontal bore threaded therethrough to receive the elongated screw 40. The ends of this screw are handled as at 41 through the end members 32—32 and each end thereof is equipped with a gear 42.

Suitably mounted at each end of the frame is a motor, one of which is denoted by the numeral 43 and the other by the numeral 44. Each of these motors is equipped with an armature shaft 45 projecting a substantial distance therefrom, and carrying a pinion 46 for meshing with the corresponding gear 42 on the screw shaft 40.

As is clearly shown in Fig. 20, a post 47 is supported adjacent the motor and this post is provided with an arm 48 and rockably supports the beam 49. The beam 49 adjacent to its fulcrum is connected to one of the brake bands 50, while the opposite end of the brake band is connected to the arm 48 as at 51. This brake band is disposed in circumscribing relation with respect to the brake drum 52, carried by the respective armature shafts 45. The opposite end of the rockable beam 49 has a link connection 53 to the armature 54 of a solenoid coil 55.

A spring 56 serves to normally maintain the armature 54 retracted and the brake band 50 engaged with the drum 52. At an intermediate point on the uppermost bar 33 of the frame, a contacting unit generally referred to by the numeral 57 is provided, while disposed in longitudinally spaced relation toward each end of the bar 33 from this contact unit 56 are the contact units generally referred to by the numeral 58.

The contact unit 47 comprises a di-electric body 59 having a tubular shank 60 disposed through an opening in the bar 33, through which the stem 61 is slidable. The upper end of this stem is secured to the plate 62 and this plate carries the depending contacts 63—63 engageable with corresponding contacts 64—64 on the body 59.

The lower end of the stem 61 has a head 65, the bottom side of which is of contact formation. Interposed between this head 65 and the lower end of the shank 60 is a compressible coiled spring 66 for normally maintaining the contacts 63—63 firmly engaged against the contacts 64—64. The shank 60 is provided with an internal panel 67 for receiving the key 68 protruding from the stem 61.

The contact units 58 each comprise a body 69 upon which the contacts 70—70 are secured. The body 69 is provided with a shank 71 for disposition thru an opening in the bar 33 and this shank embodies a bore through which the stem 72 is slidable. This stem carries a conductor plate 73 on its upper end and has a head 74 at its lower end.

The bottom side of this head is of contact formation and a spring 75 is interposed between the head and the lower end of the shank 71 for snugly maintaining the plate 73 against the contacts 70—70.

As is clearly shown in Fig. 30, the contacts 22 of the commutator at one side of the dielectric projection 21 and of section of the commutator, are connected to the stems or plates 73 of the contact units 58 beyond one side of the contact unit 57 while the contact plate 73 beyond the opposite side of the intermediate contact units 57 are connected to the contacts 22 of the commutator, at the opposite side of the other or remaining sections thereof.

The remaining contacts 22 of each section of the commutator are connected in parallel with contacts 63 on the di-electric plates 62 of the contact units 57. The contacts 63 and 64 are spaced apart when the block 35 is in its normal position. The feed mechanism of the control mechanism 14 (see Fig. 16), is for operating the elevators 18. A connecting rod 75 is pivotally connected to the block 35 as at 76, and has its opposite ends connected to the arms 77, of the quadrant 78, the latter being rockably mounted on a suitable shaft or pin 79.

Mounted in the quadrant 78 is spring projected latch 80 including a bolt 81 which normally projects into a notch on the intermediate enlarged portion 82 of the rocker arm 83. This rocker arm is also free to rotate on the shaft or pin 79 independently of the quadrant 78 when the bolt 81 is retracted from the notch therein. The elevators 13 provided with the usual prongs 84 and cables 85 are interposed between the ends of the said arm 83 and the prongs 84 on the elevators.

As is clearly shown in Fig. 16, equalizing springs 86 are provided at the ends of the armature body 17, to maintain the said body in a centralized position on the base 18, so that the gyroscopic contactor will be located in substantially the provision shown in Fig. 16.

The aileron control mechanism 15 is as shown in Fig. 1, disposed transversely of the fuselage and in right angular relation with respect to the unit 14. The mechanism disclosed in Fig. 16 is consistent with the details of the mechanism of the control unit 15, and the slide block 35, as shown in Figs. 22 and 21, are of identical construction, and are slidable in like manner between the lower bar 33 and the guide bar 34.

The section view 21 discloses the attachment associated therewith for operating the ailerons in proper distinction to the arms 77 and connecting rod 75 associated with the mechanism 14, (see Fig. 16). This attachment includes an elongated bar 87 which is pivotally connected at its upper end to the block 35 as at 88 while its lower end is provided with an opening for receiving the pin or shaft 89.

A quadrant 90 is rotatable on the shaft 89 independently of the bar 87 and has a depending shank 91. This quadrant 90 has a notch therein designated by numeral 92 and a latch 93 including the bolt 94 is mounted on the bar 87 so that the bolt 94 is normally projected into the notch 92 to connect the bar 87 and quadrant rigidly together.

Cables 95 extend from the lower end of the shank 91 over suitably arranged pulleys to the ailerons 9. In Fig. 15, the mechanism generally referred to by numeral 16 in Fig. 1, is shown in detail. This mechanism is adapted for operating the rudder 12 and includes a pair of solenoid coils 96—96 with which a common armature bar 97 is operable with a common armature bar.

This armature bar 97 has a pin 98 projecting from an intermediate portion thereof and projects between the legs 99—99 of the bifurcated end of a bar 100. This bar 100 is pivotally connected at its opposite end as at 101, to a semi-circular plate 102 which at an intermediate point on its curved periphery, is formed with a notch for receiving the bolt 103 of the latch 104, which latch is carried by the aforementioned bar 101.

Cables 105 extend from suitable points on the plate 102, to the prongs 106 of the rudder 12. It will be noted, that a screw 7 is disposed through one leg of the bar 100 at its bifurcated end so as to bear against the upper leg to maintain the legs spread apart in sufficient distance to permit the desired lost motion effect of the common armature bar 97.

By adjusting the screw 107, proper spaced relation of the leg may be retained. This will permit the bar 100 to remain substantially stationary during any slight pulsative re-action of the armature bar 97.

In Fig. 3 of the drawings, the control panel for setting the automatic mechanism, or for setting out various phases thereof it is clearly shown, the panel board being noted by numeral 107 on which the three switches 108, 709 and 110 are mounted for cutting in or out the three automatic controls.

Should the pilot desire to operate certain of the phases of the control manually, during the flight, he may operate the corresponding pull member 111. This pull member 111 has a shank 112 having a pair of notches 113 on one side thereof in the path of the spring projected ball 114.

This spring projected ball is mounted in the top 115 carried by the tube 116 through which the shank 112 is slidable. This tube connects to a base plate 117 suitably secured to the outer side of the channel or inner end of the board 107. The inner end of the shank 112 is provided with an eye 118 to which a cable 119 is secured at one end. Each of these cables 119 extend to the corresponding bolts 94 (see Fig. 14), bolt 81, (see Fig. 13) or bolt 103 (see Fig. 15).

Obviously by retracting any one of these bolts, the automatic means associated therewith is made in effect, although the particular switch be closed.

In Fig. 5, numeral 120 generally refers to a fluid compass of conventional make, the same being provided with the container 121 in which the water element 122 operates. A cover 123 is provided for this container and a partition 123' separates the container into an upper and a lower compartment, the lower compartment containing the fluid and the element 122 while the upper compartment contains the disk of di-electric material as at 124.

This disk 124 is carried by the shaft 125 which is journaled through the cover 123. As is clearly shown in Fig. 6, this disk 124 carries a pair of semi-circular shaped conductor elements 125 and 126, the same having their ends spaced apart. A fine contacting arm 127 is operatively connected to the submerged element 122 by the means 128 and when the disk 124 is properly set, this arm 127 is disposed between the ends of the elements 125 and 126.

On the face of the panel board 107, a knob 128 is rotatably mounted in association with the compass dial 129, this dial being divided into the four points of the compass and intermediate the graduations. The shaft 130 to which the knob 128 is connected, is connected to a rod 131 by a flexible connection 132. A second flexible connection 133 connects the innermost end of the rod 121 to the shaft 125.

The panel board 107 is also provided with an opening for receiving the usual speedometer instrument 134, the same being provided with the spaced partitions 135 and 136. The shaft 137 is journaled through the partition 136 and at its outer end is equipped with a knob 138, the inner end of the shaft 137 carries a disk 139 on which the arcuate-shaped conductor 140 is disposed.

The shaft 141 of the instrument 134 carries a contact arm 142 capable of wiping against the conductor 140. As is shown in Fig. 7, the arm 142 is in its normal position and interposed between this arm, and the adjacent end of the conductor 140 are the contacts 143 and 144. The arm 142 is also capable of wiping against the contacts 143 and 144. Associated with the knob 138 is the dial 145 on which is suitable indicia representing miles per hour.

The panel board 107 is provided with a third control adjustment, and this is shown in Figs. 3 and 8. The altimeter shaft 5' carries a contact arm 6' capable of wiping against either the semi-circular contactor 7' or the semi-circular shaped conductor 8'. These conductors have their ends spaced apart and are arranged in substantially a circular formation. The arm 6' is normally in disposed relation between the ends of the conductor and in the manner shown in Fig. 8.

The disks of di-electric material on which the conductors 7' and 8' are located, is adapted to be operated by the knob 9'. Associated with this knob 9' is the dial 10' to a predetermined arrangement of degrees.

The diagrammatic view of Fig. 30 will now be taken up for consideration. It will be observed that, a weak battery 12' and a relatively strong battery 13' are employed, the weak battery being in circuit with the primary circuit or relay circuit for setting in the strong circuit including the strong battery 13'. As is clearly shown in this figure of the drawing, the lead 14' extends from the positive side of the weak battery to connect to the switches 108, 109 and 110.

These switches are interposed between the said lead and the contactors 127, 142 and 6' of the compass control, air speed control and altimeter control, respectively shown in Figs. 6, 7 and 8.

A conductor 15' extends from the conductor 125 to one side of a relay 16'. A connector 17' is interposed between the opposite side of this relay and one side of the relay 18', while the opposite side of the relay 18' is connected by the wire 19' to the other conductor 126.

Thus, when the switch 108 is closed, and the conductors 125 and 126 shift, so that either contacts with the arm 127, either the relay 16' or the relay 18' will be energized for closing the corresponding strong current circuit 20' whereupon either of the coils 96—96 will be energized for practically common armature bar 97. The result is, that the rudder will be actuated to return the aircraft to its course.

Should the speed of the aircraft lessen, the arm 142 (see Fig. 7) will shift to contact with the contact 143. As is clearly shown in Fig. 30, this contact 143 is connected by the wire 21' to one side of each of the relays 22' and 23'. The current through the closed switch 109, arm 142, and wire 21' will energize both of the relays 22' and 23'. The actuation of the relay 22' will break the strong current circuit 24' in which the solenoid 25' is interposed.

At the same time, the energization of the relay 23' will close the strong current circuit 26' for energizing the solenoid section 27'. The common core 28' is thereby shifted to attract the commutator body 17. The gyroscopic contact 21 is now contacting with the contact 22 of the forward sections of the commutator which are connected to the conductor plates 73.

With the gyroscopic contactor 31 on one of the contacts 22 so located, the circuit is complete from the weak battery 12' to the corresponding solenoid 55, see Fig. 20. The brake band 50 is thereby released from the drum so that the screw 40 is free to rotate. The operation of the motor 44 operating the screw shaft 40 will feed the block 35 toward the left in Fig. 16, so as to actuate the arm 77. Resultantly the elevators 13 are set to another position, and the proper position.

If the inclined position of the plane is not sufficient to regain the necessary speed to return the arm 142 to its normal position, and the arm 142 moves to contact with the contact 144, then the relay 29' is operated for closing the strong current circuit in which the solenoid section 35 is located. In this manner, the body 17 of the commutator is shifted to another contact so that the block 35 will be fed until it disengages the next circuit breaker 58.

The same function takes place when the arm 142 must contact with the conductor 140, whereupon the relay 31' is operated to resultantly energize the solenoid section 32'. The commutator body 17 has now been slid to its furthest extent short of bringing its aircraft to a nose dive.

To compensate the ailerons 9, the control mechanism 15 is substantially the same as that shown in Fig. 16, excepting that the body 17 does not slide by the action of the solenoid sections 25', 27', 30' and 32' as in the case of the mechanism 14.

However, a gyroscopic motor is employed (see Fig. 2), and the block 35 is provided and functions in substantially the same manner. As is shown in Figs. 14 and 21, when the bar 87 is rigidly connected to the shank 91 of the quadrant 90, by means of the latch 97, any variance of the block 35 will impart a rocking motion to this unified structure. The ailerons are resultantly set by shifting of the cables 95—95.

In the operation of either the mechanism 14 or the mechanism 15, the return of the commutator to its original position, will be hastened by the changing of the gyroscopic contactor from one side of the particular commutator section, to the opposite thereof, so as to contact with the contacts on this latter side. Thus the motors 43 and 44 are independently operated to reverse the motion of the screw 40 for returning the block 35 to its normal position, (as seen in Fig. 16).

The normal position of the gyroscopic contactor is shown in Fig. 4, and its wiping engagement with one of the contacts 22 is shown in Fig. 25. In Fig. 26, the gyroscopic contactor is shown extending between a pair of di-electric projections 21 to engage the contacts of the opposite side of the particular commutator section.

To engage the contacts at the opposite side of the particular commutator section, and as before stated, any one of the automatic controls may be made inoperative by actuating the corresponding control knob 111, which in turn operates the corresponding latch.

The mechanism for operating and controlling the altitude of the air craft is substantially shown in Fig. 8. It will be noted that normally, the arm 6' is interposed between the ends of the simi-circular conductors 7' and 8'. Should the arm 6' move as a result of a gain or loss of altitude, the same will contact with either the conductor 8' or the conductor 7'. Should the same contact with the conductor 8', the relay 35' will be energized.

This will close the strong current circuit including the solenoid section 25' resulting in a consequential movement of the commutator, so that the elevators will become set for returning the craft to the proper altitude. When the conductor 7' is engaged by the contactor 6', the relay 36' is energized and this results in the energizing of the solenoid section 27'. This results in a reversed movement of the commutator of the mechanism 14, so that the elevators will be set at an opposite position for steering the aircraft upwardly, to regain its altitude.

It will be noted in Fig. 30, that in the event the aircraft does not regain its proper speed upon the contact of the hand 142 with the contact 143, the contact of the hand 142 with the contact 144, will result in the energization of the electric horn 37' so that in the event the pilot is unconscious of conditions, he will be warned.

While the foregoing specification described the invention in detail, it is to be understood that various changes in the shape, size, materials, may be resorted without departing from the spirit and scope of the invention as claimed hereinafter.

Having thus described my invention, what I claim as new is:—

1. An automatic control for aircraft including the usual elevators and rudder; means for setting the said elevators at a given level, means associated with the said rudder for maintaining the same properly set, said last-mentioned means comprising a pair of electro-magnetic coils, a common armature for the said coils, a bar bifurcated at one end, a pin on the armature, positioned between the furcations of the said bar, means for adjusting the said furcations, and a connection between the said bar and the rudder.

2. An automatic control for aircraft including the usual elevators and rudder; means for setting the said elevators at a given level, means associated with the said rudder for maintaining the same properly set, said last-mentioned means comprising a pair of electro-magnetic coils, a common armature for the said coils, a bar bifurcated at one end, a pin on the armature, positioned between the furcations of the said bar, means for adjusting the said furcations, a connection between the said bar and the rudder, said connection comprising a quadrant pivotally connected to the bar, a connection between the quadrant and the rudder, and a manually operated latch on the bar for engagement with the quadrant to rigidly connect the latter to the bar.

3. An automatic control for aircraft including the usual elevators and rudder; a slide block, a screw for feeding the said block, a connection between the block and the elevators, a gyroscopic contactor, a plurality of contacts arranged in an arc, and a circuit including a motor and provided with a plurality of circuit breakers, so that the inclination of the contact will determine to what extent the blocks may be fed by the screw driving connection between the said motor and the screw.

4. An automatic control for aircraft including the usual elevators and rudder; a slide block, a screw for feeding the said block, a connection between the block and the elevators, a gyroscopic contactor, a plurality of contacts arranged in an arc, and a circuit including a motor and provided with a plurality of circuit breakers, so that the inclination of the contact will determine to what extent the blocks may be fed by the screw driving connection between the said motor and the screw, a speedometer, a multiple coil solenoid including an armature, said armature being connected to the contacts, a plurality of contacts, and a contactor, a source of current, said contactor being operated by the speedometer and the contact being connected in circuit with the separate coils of the solenoid.

5. An automatic control for aircraft including the usual elevators and rudder; a slide block, a screw for feeding the said block, a connection between the block and the elevators, a gyroscopic contactor, a plurality of contacts arranged in an arc, and a circuit including a motor and provided with a plurality of circuit breakers, so that the inclination of the contact will determine to what extent the blocks may be fed by the screw driving connection between the said motor and the screw, a speedometer, a multiple coil solenoid including an armature, said armature being connected to the contacts, a plurality of contacts and a contactor, a source of current, said contactor being operated by the speedometer and the contact being connected in circuit with the separate coils of the solenoid, and clutch means for disengaging the motor.

In testimony whereof I affix my signature.

JIMMY TERRY.